United States Patent [19]
Marik

[11] Patent Number: 5,905,230
[45] Date of Patent: May 18, 1999

[54] SELF TAPPING SCREW FOR USE WITH AN ELECTRICAL CONNECTOR

[75] Inventor: Greg Marik, Germantown, Tenn.

[73] Assignee: Thomas & Betts Corporation, Memphis, Tenn.

[21] Appl. No.: 08/515,194

[22] Filed: Aug. 15, 1995

[51] Int. Cl.⁶ .................................................. H02G 3/18
[52] U.S. Cl. ........................................ 174/65 R; 439/472
[58] Field of Search ........................... 174/65 R; 411/378, 411/387; 439/472; 285/128, 404

[56] References Cited

U.S. PATENT DOCUMENTS

| | | | |
|---|---|---|---|
| 2,382,019 | 8/1945 | Miller | 85/41 |
| 2,973,212 | 2/1961 | Rose | 285/159 |
| 2,993,950 | 7/1961 | Forman | 174/138 D |
| 3,878,759 | 4/1975 | Carlson | 411/416 |
| 3,909,916 | 10/1975 | Neff et al. | 29/235 |
| 4,040,328 | 8/1977 | Muenchinger | 411/412 |
| 4,275,541 | 6/1981 | Orals et al. | 52/481.1 |
| 4,778,319 | 10/1988 | Schule | 411/387 |
| 4,834,671 | 5/1989 | Vigna et al. | 439/416 |
| 5,539,152 | 7/1996 | Gretz | 174/65 R |
| 5,553,787 | 9/1996 | Guginsky | 439/472 |

*Primary Examiner*—Nestor Ramirez
*Assistant Examiner*—Joseph Waks
*Attorney, Agent, or Firm*—Hoffmann & Baron, LLP

[57] ABSTRACT

A conduit connector provides for the movable attachment of a conduit saddle to a connector body. The connector includes a connector body having an interior for accommodating the conduit. The connector body includes a body aperture therethrough. The conduit saddle is movably supported interiorly of the body for movement into engagement with the conduit. The conduit saddle includes a saddle aperture therethrough. An elongate screw having a head at one end and an elongate shaft is employed for attaching the saddle to the body. The screw includes a first shaft section and a spaced second shaft section. Each of the first and second shaft sections include self tapping threads for self tapping respective engagement with the body and the saddle through the body aperture and the saddle aperture

7 Claims, 2 Drawing Sheets

SELF TAPPING SCREW FOR USE WITH AN ELECTRICAL CONNECTOR

FIELD OF THE INVENTION

The present invention relates generally to a self tapping screw which may be used to attach a pair of components. More particularly, the present invention relates to an electrical connector which movably supports a connector saddle thereto by use of a self tapping screw which taps into both the connector and the saddles.

BACKGROUND OF THE INVENTION

In commercial and residential construction, electrical conductors which run between various locations are typically housed in an outer protective jacket. Such structures are referred to as electrical conduits. One such conduit is a flexible, metallic conduit where the conduit includes an outer helically convoluted metal jacket for enhanced flexibility. The conduit is terminated to an electrical junction or outlet box and the individual conductors are terminated to an electrical device supported in the junction box.

In order to suitably retain the conduit in the junction box, a conduit connector or fitting is employed to terminate the conduit and to mechanically and electrically support the conduit to the junction box itself. Conduit connectors of this type are well-known in the electrical connection art. These connectors typically include a cylindrical body which supports therein an end extent of the conduit. The cylindrical body is attachable to the junction box through a knock-out opening to allow passage of the conductors into the junction box. A screw may be interposed through the wall of the body to engage the conduit to securely retain the conduit within the body of the connector.

Also, in order to mechanically attach the connector to the outlet box within the opening, the cylindrical body of the connector may be of the split-shell type, where upon tightening of the screw against the conduit, the respective shells of the connector body open up slightly so as to engage the wall of the outlet box about the opening U.S. Pat. Nos. 3,147,776 and 3,556,566 are examples of this type of conduit connector.

Improvements in such conduit connectors include the use of conduit engaging saddles attached to the end of the screw interposed through the body of the connector. The saddles are designed to engage the conduit to provide further retentive securement of the conduit within the connector body. Examples of the use of saddles in combination with conduit connectors are shown in U.S. Pat. Nos. 2,490,286 and 2,643,136.

While the saddles shown in these patents attempt to provide improved retention of the conduit within the connector body, these connectors of the prior art suffer from two distinct disadvantages.

First, the saddles themselves, while providing additional securement for the conduit within the connector body, fail to provide the axial pullout strength required in order to restrain the conduit from being easily pulled from the connector body once the connector is attached to the junction box. Additionally, as the saddles are attached to the end of the screw extending through the connector body, such attachment requires complicated manufacturing steps or modifications to the connector body in order to provide access to the end of the screw for attachment of the saddle thereto.

In above-referenced U.S. Pat. No. 2,643,136, access to the interior of the conduit connector must be provided so as to permit swaging of the tip of the screw so as to retain the saddle thereon. Further, in U.S. Pat. No. Des. 336,282 and Des. 360,188, the undersurface of the connector must be provided with an access opening to enable a tool to be inserted therein so that the saddle may be staked or connected to the end of the screw.

It is therefore desirable to provide a conduit connector which provides for increased axial pullout strength and which may be manufactured more simply and efficiently.

SUMMARY OF THE INVENTION

It is an object of the present invention to provide an improved self tapping screw which movably supports one component to another component.

It is a further object of the present invention to provide a self tapping screw used in electrical connectors which supports a connector saddle to the body of the connector for relative movement with respect thereto.

In the efficient attainment of these and other objects, the present invention provides self tapping screw for movable attachment of a pair of components, each of the components having apertures therethrough. The screw includes an elongate member having a head at one end and an elongate distally extending shaft. The shaft includes a first threaded shaft extent and a distally spaced second threaded shaft extent. The first threaded shaft extent includes a self tapping thread to effect self tapping insertion of the first shaft extent through the aperture of one of the components of the pair. The second shaft extent includes a second self tapping thread to effect self tapping insertion of the second shaft extent through the aperture of the other component of the pair. The first shaft extent is threadingly movable through the aperture of the one component to effect relative movement of the pair of components.

As more particularly described by way of the preferred embodiment shown herein, the present invention provides an electrical conduit connector. The connector includes a connector body defining a connector interior for accommodating a conduit. The connector body includes a body aperture therethrough. A conduit saddle is movably supported interiorly of the body for movement with respect to the connector body for engagement with the conduit. The saddle includes a saddle aperture therethrough. The conduit saddle is connected to the connector body by use of a self tapping screw. The screw is an elongate member having a head at one end and an elongate shaft. The shaft includes a first shaft section and a second shaft section longitudinally spaced therefrom. First and second shaft sections are externally threaded and include self tapping threads for respective self tapping advancement through the body aperture and the saddle aperture to effect self tapping attachment of the body and the saddle.

The diameter of the first shaft section is larger than the diameter of the second shaft section so that the second shaft section passes through the body aperture and into self tapping engagement with the saddle aperture.

Further, a third shaft section is defined between the first and second shaft section which provides for resident accommodation of the saddle therein.

DETAILED DESCRIPTION OF THE PREFERRED EMBODIMENT

Figure 1:
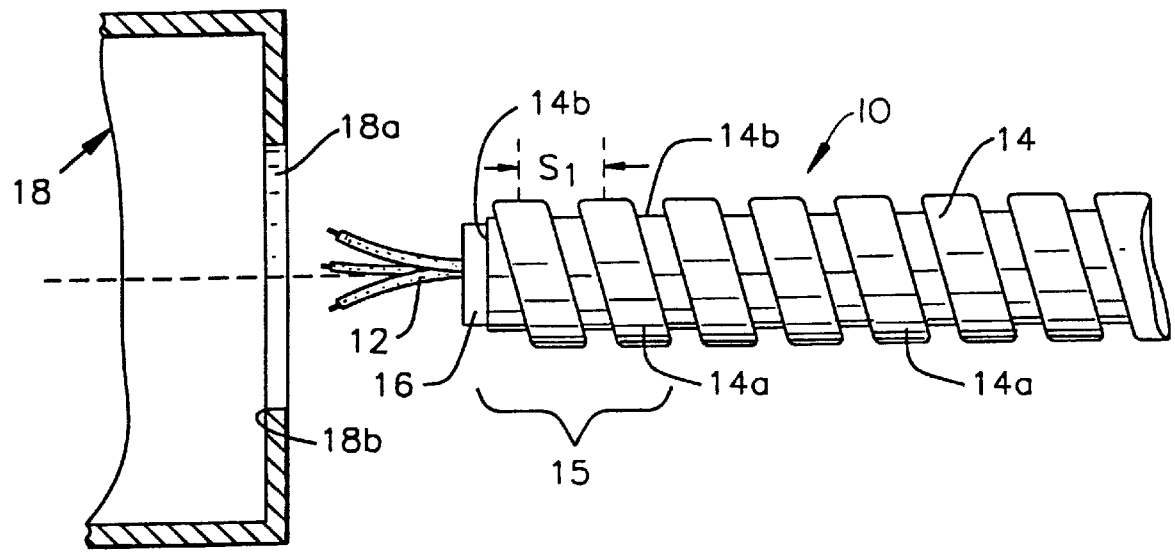
FIG. 1 shows an end portion of a flexible metallic conduit positioned for termination to an electrical junction box shown in partial section.

Referring to FIG. 1, a conventional electrical conduit 10 is shown. Conduits of the type known in the art typically include an outer tubular jacket which surrounds insulated electrical conductors. The outer jacket may be formed of a wide variety of materials including both insulative and conductive materials.

In the present illustrative embodiment, conduit 10 is a flexible metallic conduit including an outer metallic jacket 14 and plural insulated electrical conductors 12 extending therethrough. Outer jacket 14 includes successively longitudinally spaced helical convolutions 14a spaced apart a given distance $S_1$. The convolutions of outer jacket 14 provide for increased flexibility of conduit 10. In certain other conduit constructions, conduit 10 may include an inner intermediate jacket such as that shown at 16, formed of insulative material positioned between outer jacket 14 and conductors 12.

In typical residential or commercial construction, the conductors 12 of conduit 10 are terminated within an electrical junction box 18. A terminated end extent 15 of conduit 10 is inserted into box 18 through knockout opening 18a so that the conductors 12 may be terminated to an appropriate termination device such as an electrical receptacle (not shown) supported within junction box 18.

It is well-known in the electrical connection art to employ a conduit connector or fitting to securely retain the terminated end extent 15 of conduit 10 within junction box 18. Such conduit connectors are attachable to the junction box about the knock-out opening and support the end of the conduit thereat. The present invention provides an improved conduit connector 20, which is shown in FIGS. 2–5.

Connector 20 of the present invention includes an elongate connector body 22 which has a generally hollow cylindrical shape and includes a conduit receiving end 24 and an opposed conductor egressing end 26. Conduit body 22 defines a conduit receiving passage 28 between ends 24 and 26. The conductor egressing end 26 of body 22 includes a generally circular opening 26a through which conductors 12 may extend. In order to prevent abrasive engagement of the insulated conductors 12 with the metallic edge defining circular opening 26a, a plastic insulative throat 34 may be situated therein.

In conventional fashion conduit 10 is inserted into conduit connector 20 through conduit receiving end 24. Conduit 10 is inserted such that a forward edge 14b of outer jacket 14 abuts against insulative throat 34. Conductors 12 extending from conduit 10 extend through conductor egressing end 26 and through circular throat 34. Positioned in this manner, terminated end extent 15 of conduit 10 resides within passage 28 of body 22.

Figure 2:
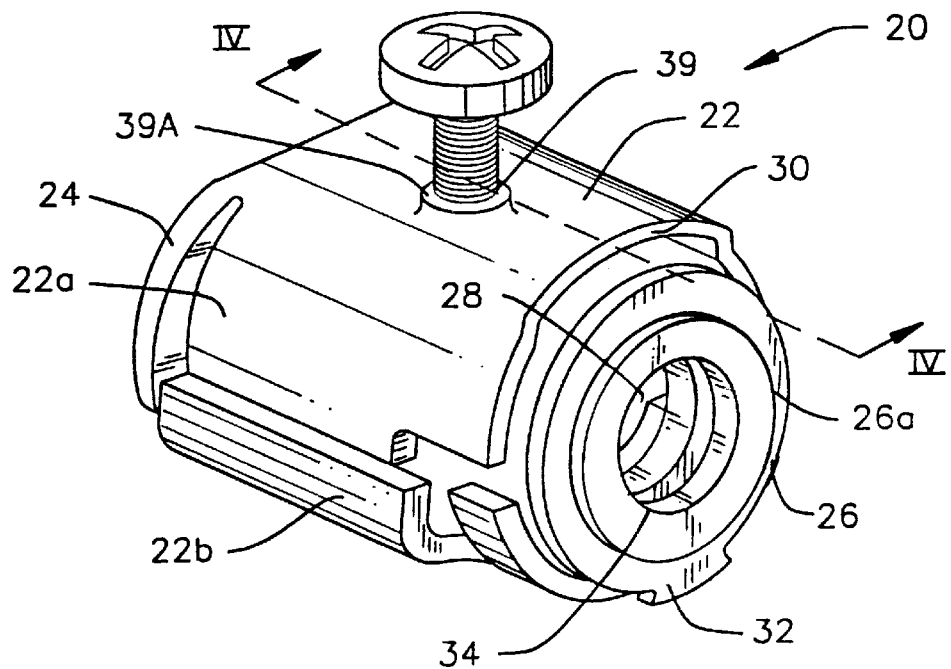
FIG. 2 is a perspective showing of an electrical conduit connector of the present invention.

Connector body 22 is formed from a flat metal blank which is stamped and formed into the configuration shown in FIG. 2. The resulting connector body 22 includes upper and lower relatively movable connector halves 22a and 22b which are movable in a clam-shell fashion about the pivot formed by conduit receiving end 24. The conductor egressing end 26 of body 22 includes raised upper and lower lips 30 and 32. In conventional fashion body 22 may be inserted into knockout opening 18a of junction box 18 (FIG. 1) by squeezing the upper and lower halves 22a and 22b of body 22 together. Once inserted within the opening, the body 22 may be radially expanded, in a manner which will be described in further detail hereinbelow so that the lips bear against the inside wall 18b of junction box 18 about knockout opening 18a so as to support conduit connector 20 within the opening.

Figure 3:
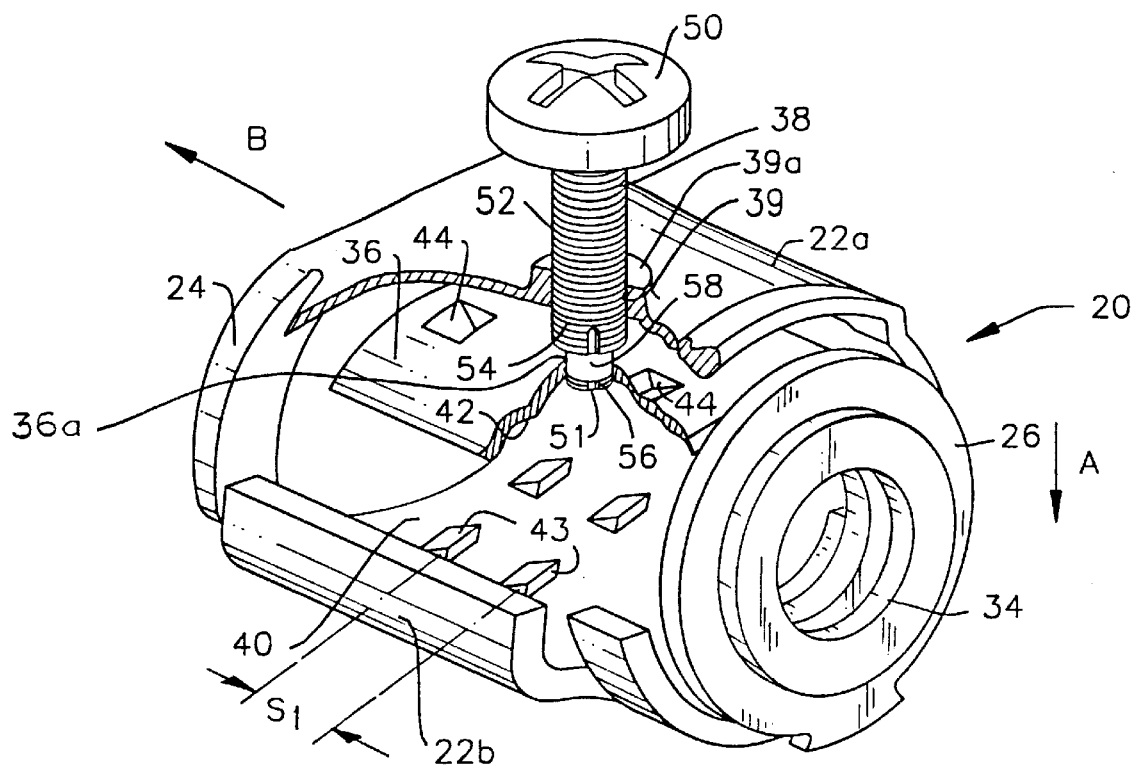
FIG. 3 is a perspective showing of the conduit connector of FIG. 2, in partial section, showing the interior of the connector.
Figure 4:
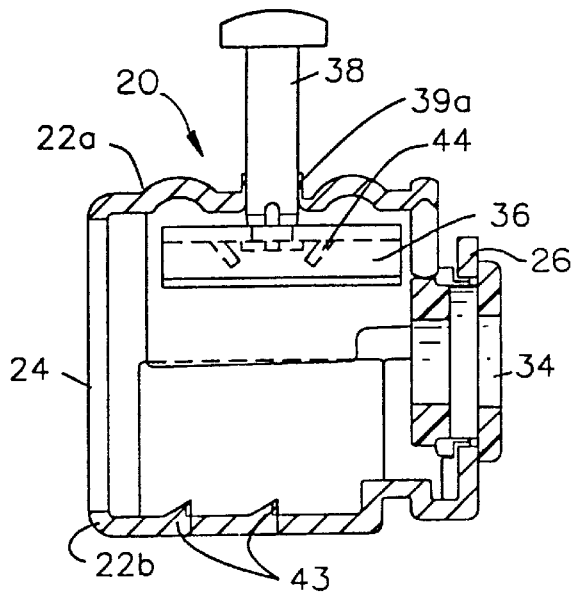
FIG. 4 is a vertical sectional showing of the connector of FIG. 2 taken generally through the lines IV—IV thereof.
Figure 5:
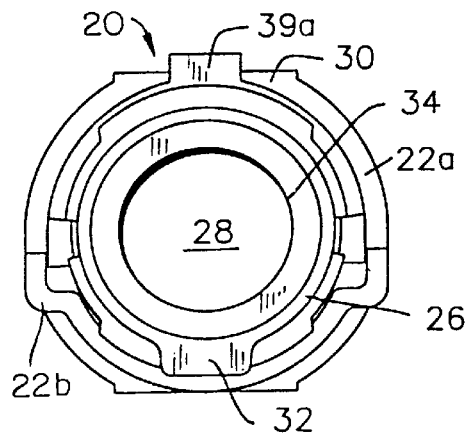
FIG. 5 is a front plan view of the connector of FIG. 2.

Referring to FIGS. 2–4, conduit connector 20 further includes a conduit engaging saddle 36 supported within passage 28 of connector body 22. Saddle 36 is an elongate member having a slight arcuate configuration which is engagable with outer jacket 14 (FIG. 1) of conduit 10 upon termination of conduit 10 within connector 20. Saddle 36 is supported to connector body 22 by an externally threaded screw 38 in a manner which will be described in further detail hereinbelow. Screw 38 extends through an aperture 39 which is centrally located through upper half 22a of body 22. A raised annular collar 39a of body 22 defines aperture 39. Saddle 36 is movable in the direction of arrow "A" (FIG. 3) by the actuation of screw 28 for movement into engagement with conduit 10 inserted within connector body 22.

In normal use, the conductor egressing end 26 of body 22 is inserted into the knockout opening 18a of junction box 18 (FIG. 1). The resilient action of the upper and lower halves 22a and 22b of body 22 permits the body to be inserted into the knockout opening 18a by compressing the halves together. The upper and lower lips 30 and 32 will spring back against the inner wall 18b of junction box 18 about knockout opening 18 to loosely support the conduit 10 and connector 20 within the opening of the junction box. In order to securely retain the connector 20 and conduit 10 within the opening 18a, screw 38 is tightened so that the saddle 36 becomes firmly engaged with the outer jacket 14 of conduit 10 supported therein. Continued screw tightening of screw 38 clamps the outer jacket 14 of conduit 10 between a lower interior surface 40 of body 22 and an inwardly-facing surface 42 of saddle 36. Further additional screw tightening of screw 38, with the conduit 10 clamped within the body 22, forces the upper and lower body halves 22a and 22b apart expanding conduit connector 20 to a point where upper and lower lips 30 and 32 are placed in tight firm engagement with the periphery of opening 18a of junction box 18. Thus, the tightening of screw 38 both secures the conduit 10 within the body 22 of connector 20 and secures the conduit connector 20 within the opening 18a of junction box 18.

In order to provide for increased resistance against axial pullout of conduit 10 from connector 20, the present invention provides a plurality of inwardly directed lances 43 extending from a lower interior surface 40 of body 22. Lances 43 are positioned in transverse and longitudinal spaced apart relationship and extend for engagement with the outer jacket 14 of conduit 10 Lances 43 are angled upwardly toward conductor engagement end 26 of body 22. The longitudinal spacing of lances 43 are such that they equal the spacing $S_1$ between the individual convolutions 14a of outer jacket 14 (FIG. 1). Further, the lances 43 extend outwardly from lower interior surface 40 a vertical distance which substantially equals the depth of the convolution 14a. Thus, the lances will have a tendency to reside between the convolutions 14a upon tightening of saddle 36 onto outer jacket 14. The lances 43 extended inwardly at an angle with respect to the longitudinal axis of connector 20 so that upon tightening of the saddle 36 the lances will have a tendency to ride over the raised rounded peaks of convolutions 14a and into the valleys 14b between adjacent convolutions. The position and location of the lances 43 and their engagement with jacket 14 between convolutions 14a helps resist axial pullout (arrow "B") of conduit 10 from connector 20 once the connector and conduit are firmly attached to junction box 18.

In a similar fashion the inwardly-facing surface 42 of saddle 36 may also include a pair of longitudinally spaced lances 44 which are also spaced a distance apart which is a multiple of $S_1$ so that lances 44 will reside within valleys 14b the convolutions 14a of outer jacket 14. Lances 44 are provided for secondary axial securement of conduit 10. The primary resistance to axial pullout is provided by lances 43 of body 22. Thus, the directional orientation of lances 44 of saddle 36 is not as critical as that of lances 43. Accordingly, in the embodiment shown herein, the lances 44 extend in opposite mutually-facing directions. This allows the saddle 36 to be inserted into body 22 in either direction during manufacture. Also, lances 44 are staggered longitudinally with respect to lances 43 to provide engagement with the helically extending convolutions 14a.

A further feature of the present invention is shown particularly with respect to FIGS. 3 and 4. As mentioned above, the saddle 36 is attached to a distal end of screw 38. In prior art practices the saddle would be attached to screw 38 by swaging or staking the end of the screw to the saddle. Such securement technique would require access to the interior of the formed connector in order to assemble the saddle to the screw. Such assembly requirements complicate the manufacturing process making assembly of the connector more difficult and costly. The present invention provides a simplified method of securing screw 38 to saddle 36 by providing a specially manufactured screw design.

Screw 38 of the present invention is an elongate member having a head 50 at one end and an externally threaded shaft 52 extending therefrom. The shaft 52 includes an upper shaft section 54 adjacent head 50 and a lower shaft section 56 adjacent the distal end 51 of screw 38. The upper shaft section 54 includes external threads including a self-tapping thread at the end thereof which will tap through aperture 39 of body 22 of connector 20. The lower shaft section 56 has a diameter which is reduced from the diameter of upper shaft section 54 and also includes a self-tapping thread which is designed to thread through an aperture 36a in saddle 36. An unthreaded recessed section 58 of shaft 52 is provided between shaft sections 54 and 56. Unthreaded section 58 has a diameter less than that of lower shaft section 56 and is designed to capture and retain saddle 36 therein.

The screw and the saddle are attached to body 22 of connector 20 in the following manner. Appropriately sized drilled apertures 39 and 36a are placed respectively in body 22 and saddle 36. The saddle 36 is inserted into body 22 through conduit receiving end 24. The saddle 36 is held against the upper half 22a of body 22 by a mandrel (not shown) inserted therein. Apertures 39 and 36a are held in general alignment. Screw 38 is then driven into both components at the same time. The smaller diameter of lower shaft section 56 passes fully through aperture 39 of body 22 without interference. The self tapping threads on lower shaft section 56 then thread through aperture 36a of saddle 36 while at the same time the self-tapping threads of larger diameter upper shaft section 54 thread through aperture 39. Once the self tapping threads of lower shaft section 56 pass through aperture 36a, the saddle 36 will become captured within recessed section 58 between upper shaft section 54 and lower shaft section 56. As the diameter of upper shaft section 54 is significantly larger than the aperture 36a in saddle 36, the self-tapping thread on section 54 will not thread into aperture 36a. The saddle 36 has a thickness which is slightly smaller than the longitudinal extent of recessed section 58 so that the saddle is loosely captive between upper shaft section 54 and lower shaft section 56.

As may be appreciated, in order to effect assembly of saddle 36 to body 22, it is only necessary to hold saddle 36 adjacent the upper half 22a of body 22 during the tapping assembly. There is no need to insert swaging tools within the connector to swage the end of screw 38 to captivate saddle 36. Thus, assembly time and cost is greatly reduced.

Various changes to the foregoing described and shown structures would now be evident to those skilled in the art. Accordingly, the particularly disclosed scope of the invention is set forth in the following claims.

What is claimed:

1. An electrical conduit connector for terminating a length of conduit comprising:

a connector body defining a connector interior for accommodating said conduit, said connector body including a body aperture therethrough;

a conduit saddle movably supported interiorly of said body for movement with respect thereto for engagement with said conduit, said saddle having a saddle aperture therethrough; and saddle attachment means including an elongate screw having a head at one end and an elongate shaft, said shaft having a first externally threaded shaft section adjacent said head and a second externally threaded shaft section distally spaced from said first shaft section, said first and second externally threaded shaft sections including self tapping threads for respective self tapping advancement through said body aperture and said saddle aperture to effect self tapping attachment of said body and said saddle to said screw, said first externally threaded shaft section being threadingly movable through said body aperture to effect said movement of said saddle with respect to said body.

2. An electrical conduit connector of claim 1 wherein said shaft includes an unthreaded third shaft section intermediate said first and second shaft section for captive receipt of said saddle.

3. A conduit connector of claim 2 wherein said body aperture has a first diameter and said saddle aperture has a second diameter less than said first diameter and wherein said first shaft section has an outer diameter substantially equal to said first diameter to permit self tapping insertion into said body aperture and said second shaft section has an outer diameter substantially equal to said second diameter to permit self tapping insertion into said saddle aperture; and wherein said first shaft section is prevented from effecting self tapping insertion into said saddle aperture.

4. A conduit connector of claim 3 wherein said third shaft section has a diameter less than said second diameter.

5. A conduit connector of claim 4 wherein said longitudinal extent of said third shaft section is slightly greater than the thickness of said saddle.

6. A self tapping screw for movable attachment of a pair of components having apertures therethrough, said screw comprising:

an elongate member having a head at one end and an elongate shaft extending distally from said head;

said shaft having a first threaded shaft extent and a distally spaced second threaded shaft extent;

said first shaft extent including first self tapping threads to effect self tapping insertion of said first shaft extent through said aperture of one of said components of said pair, said first self tapping threads located at a generally circular terminating end of said first shaft extent, said terminating end defining a plane passing therethrough and perpendicular to said elongate shaft;

said second shaft extent including second self tapping threads to effect self tapping insertion of said second shaft extent through said aperture of the other of said components of said pair; and wherein a portion of said second shaft extent intersects said plane, and wherein said portion of said second shaft extent has a diameter which provides a step transition between said first and second shaft extents at said intersection of said plane.

7. A self tapping screw of claim 6 wherein said first and second shaft extents are longitudinally spaced apart.

* * * * *